July 10, 1951 S. CHAPP 2,559,944
DIFFERENTIAL GEARING
Filed Sept. 28, 1948 3 Sheets-Sheet 1
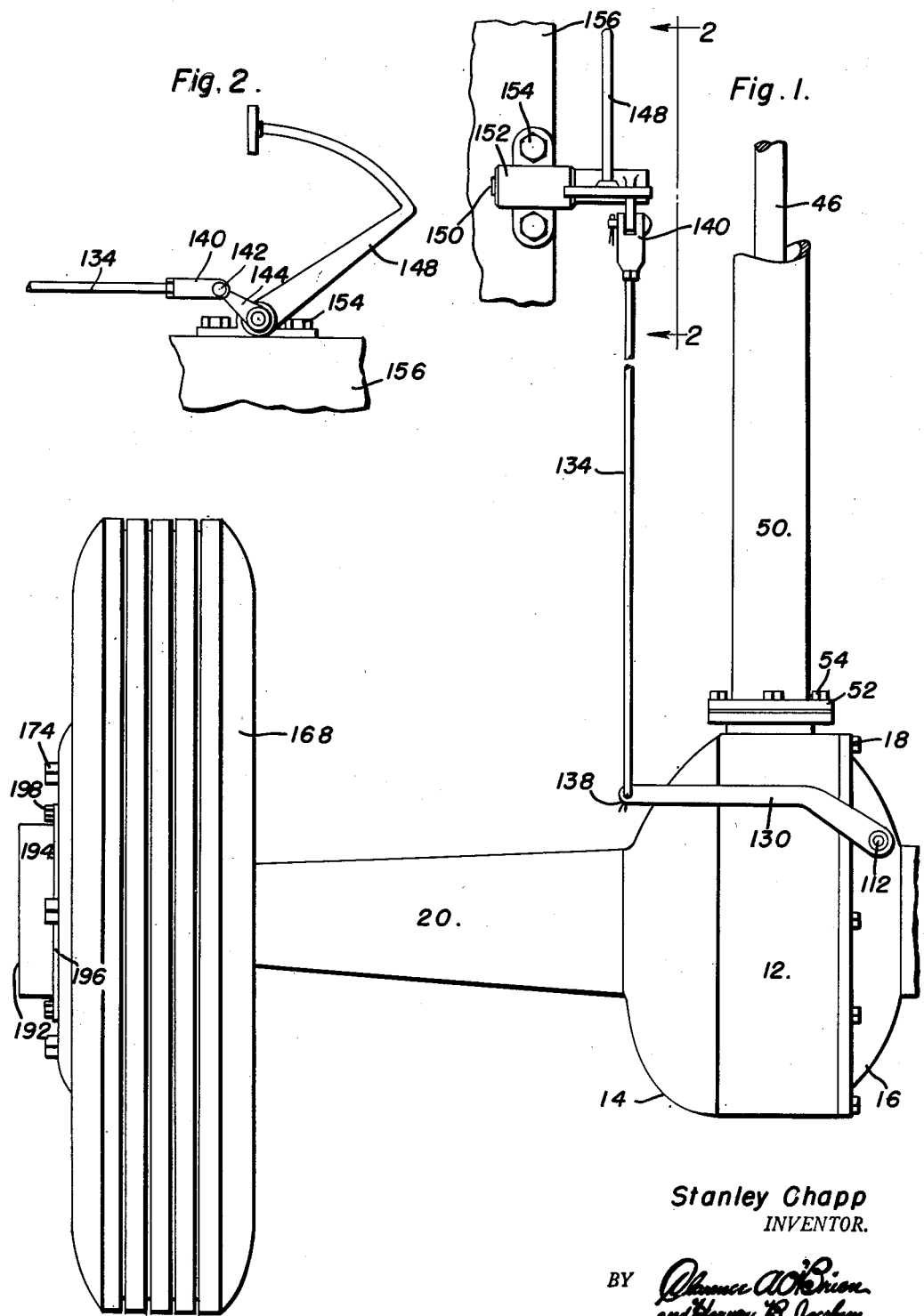
Stanley Chapp
INVENTOR.
BY
Attorneys July 10, 1951         S. CHAPP         2,559,944
DIFFERENTIAL GEARING
Filed Sept. 28, 1948                3 Sheets-Sheet 3

Stanley Chapp
INVENTOR.

BY Clarence A. O'Brien
and Harvey B. Jacobson
Attorneys

Patented July 10, 1951

2,559,944

UNITED STATES PATENT OFFICE 2,559,944

DIFFERENTIAL GEARING

Stanley Chapp, Foley, Minn.

Application September 28, 1948, Serial No. 51,588

5 Claims. (Cl. 74—710.5)

This invention relates to novel and useful improvements in the driving wheel assembly for a motor vehicle and has for its primary object to provide a differential with a clutch by means of which a gear may be locked to the gear casing and thereby effect dependent rotation of the two sections of a rear axle.

Another important object of this invention is to provide novel means for securing the axle sections in a differential casing and for securing driving wheels to the outer ends of the axle sections or shafts.

Another important object of this invention is to lock both rear wheels or driving wheels of an automobile or the like when one wheel spins in mud, snow or sand or when an axle key strips or an axle breaks so that the two wheels will not turn independently of each other but the two axle sections of the rear axle will rotate together so that the two wheels may be caused to turn at the same rate of speed.

Another object of this invention is to provide clutch means in a differential for locking a normally independent axle to the gear casing and thereby effecting rotation of the two axle sections at the same rate of speed, the clutch being externally operated of the gear housing section of the differential housing by means of a pedal or like located in the automobile adjacent to the operator's normal driving position.

Another important object of this invention is to provide clutch means for a differential, the axle sections or shafts of the rear axle being slidably locked in the differential casing and having novel means on their outer ends for attachment to a pair of driving wheels.

Another important object of this invention is to provide a pair of axle sections for a rear axle, the inner ends of the axles being splined for slidably engaging and locking in a pair of gears rotatably disposed in the rotating differential casing, with the opposite or outer ends of the axle sections being provided with axle plates for bolting or fastening to a pair of brake drums rotatably disposed at the outer end of the axle casings, these plates being provided for operatively securing the driving wheels to the brake drums so that rotation is imparted from the axle sections to the driving wheels through the brake drums.

These and ancillary objects and other improvement features are attained by this invention, a preferred embodiment of which has been illustrated in the accompanying drawings, wherein:

Figure 1 is a top plan view of the differential and one of the rear wheels and axle casing, the differential housing having the improved clutch associated therewith and illustrating the external means provided for actuating the clutch;

Figure 2 is a view taken on line 2—2 of Figure 1;

Figure 3:
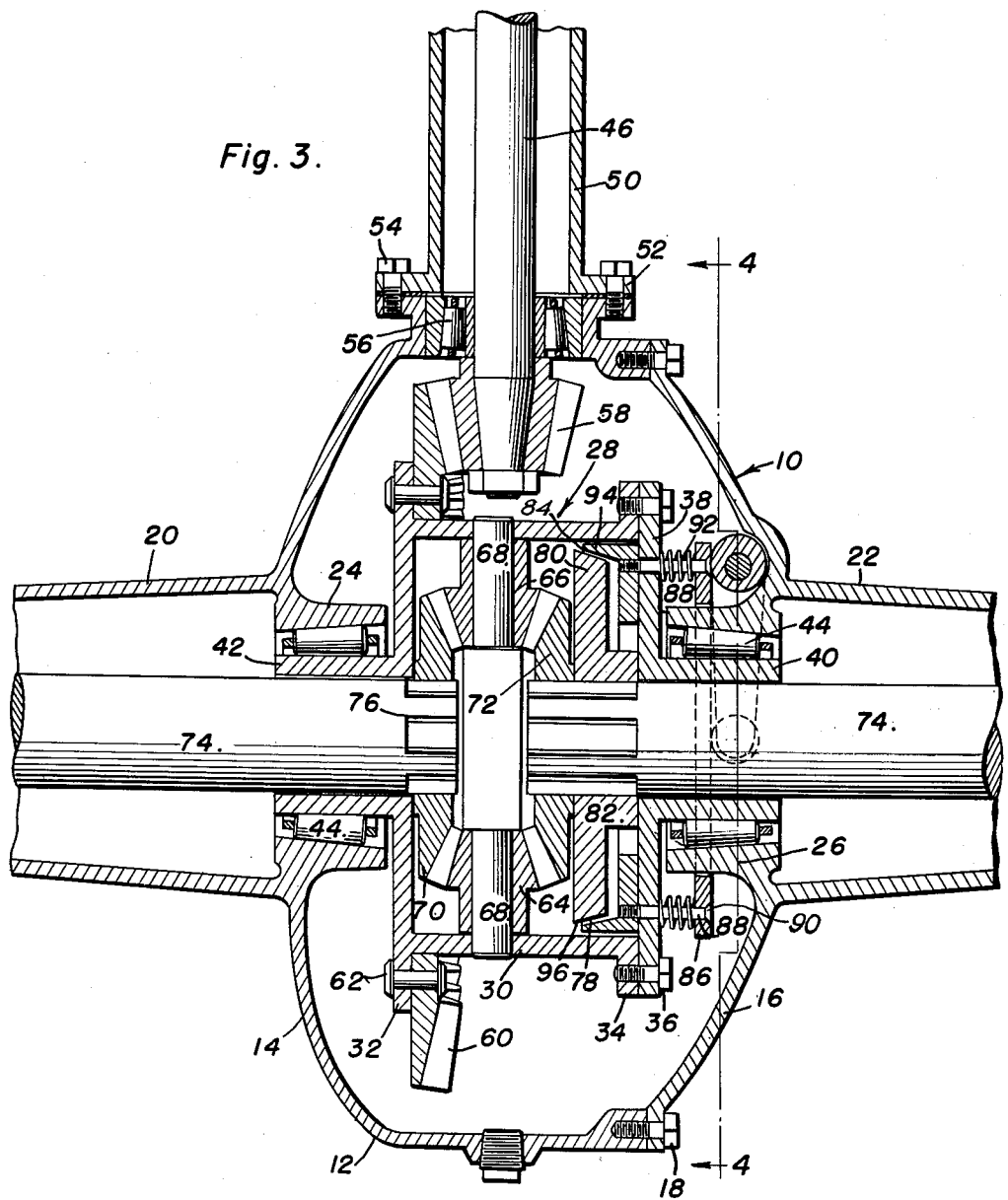
Figure 3 is a longitudinal sectional view of the differential.

Attention is first directed to Figure 3, wherein the differential, generally designated by the character reference 10 is illustrated. The differential includes a housing 12 formed of separable sections 14 and 16, which are bolted or otherwise conventionally fastened, as at 18. Extending outwardly from the opposed side walls of the housing are a pair of outwardly tapering axle casings 20 and 22, the same being formed integrally with the separable sections of the differential housing. The opposed sections are provided centrally with opposed sleeves 24 and 26 and rotatably disposed in these sleeves is a differential casing 28.

The differential casing 28 consists of a section 30 having an end annular flange 32 and an opposed annular flange 34, the latter being releasably bolted or attached, as at 36 to a companion side section 38. The sections 30 and 38 are formed with outwardly extending sleeves 40 and 42, the same being rotatably disposed in the sleeves 24 and 26 and frictionally spaced therefrom by bearings 44.

A main drive shaft 46 operatively extends into the housing 12 and is surrounded by a torque tube 50, having one end formed with a collar 52 secured to the housing sections 14 and 16 by bolts 54 passing securely therethrough. The drive shaft 46 is rotatably mounted in the housing 12 by means of bearings 56 and carries at its inner end the usual pinion 58. The pinion 58 is disposed in meshing engagement with a gear ring 60, the same being secured as at 62 to the annular flange 32 of the casing 48. Thus, when the drive shaft 46 leading from the motor of the vehicle is rotated, rotary motion will be imparted to the gear casing 28. A pair of opposed miter gears or pinions 64 and 66 are mounted on hubs 68 and rotatably disposed in the casing. Gears 70 and 72 are detachably mounted upon the inner ends of the axle sections or driven shafts 74 to rotate therewith, the gears being enclosed by the casing 28 and disposed in meshing engagement with the pinions or miter gears 64 and 66, forming a planetary gearing.

The inner ends of the axle sections 74 are splined, as at 76, so that the same are slidably locked in the gears 70 and 72 and can be moved longitudinally therefrom out of engagement therewith. The advantage of the foregoing locking arrangement between the axle sections 74 and the gears 70 and 72 will become more apparent, during the description of the wheel structure.

As can be seen, when the gear casing 28 is rotated by the drive shaft 46, the pinions or miter gears 64 and 66 will rotate and impart a rotary motion to the axle sections 64 through their respective gear ends 70 and 72. Thus, the axle sections are free to rotate independently of each other or at a different rate of speed, so that the differential thus far described, functions conventionally to allow the wheels of an automobile to rotate at different speeds from each other when the automobile is turning.

However, as aforementioned, it is desirable, under certain conditions, to effect a rotation of the two wheels at the same rate of speed in order to prevent skidding and to allow the automobile to start easily and conveniently even if one of the wheels is mired in mud or the like.

Thus, a clutch arrangement or structure 78 is provided to selectively produce a locked rear end upon operation thereof with the axle sections disposed so that they rotate unitarily at the same rate of speed causing the wheels to rotate at the same rate of speed.

The clutch 78 includes a clutch plate 80 having a collar 82, which is mounted on the splined end of one of the axle section 74. A complementary clutch plate 84 is rotatably disposed in the differential casing 30 for cooperative locking engagement with the plate 80. Thus, the plate 80 is fixed on the splined end of the axle section 74 and the plate 84 constitutes a movable clutch plate which is adapted for movement relative to the fixed clutch plate 80.

Figure 4:
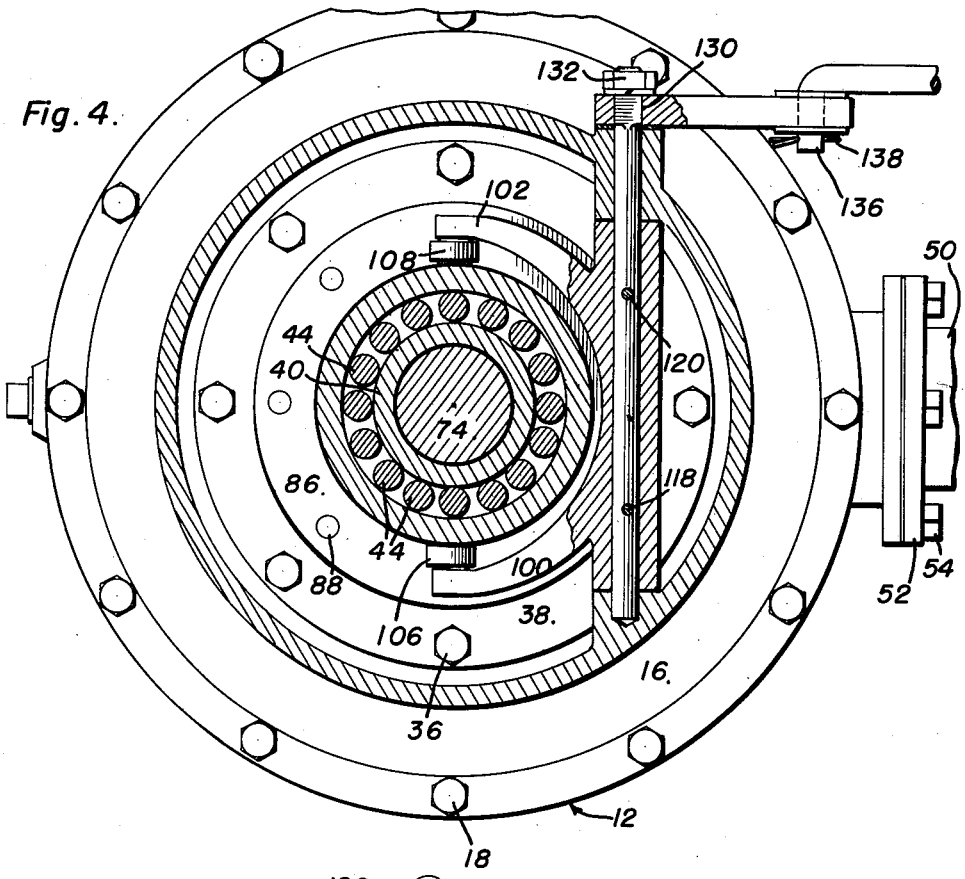
Figure 4 is a sectional view taken on line 4—4 of Figure 3.
Figure 5:
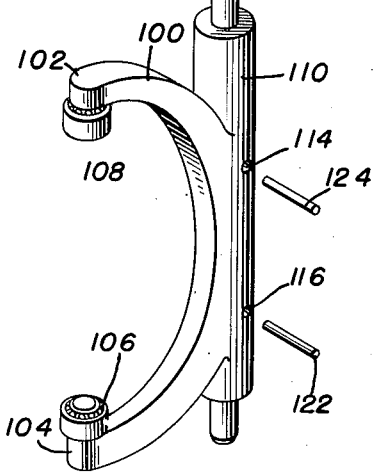
Figure 5 is a perspective view of the actuating yoke.

A sliding motion is imparted to the movable plate 84 by means of an annular ring 86 which is rotatably mounted on the outer surface of the sleeve 26. As seen in Figures 4 and 5, a plurality of guide pins or rods 88 extend laterally from the ring 86 and have head ends 90 countersunk in the ring. The opposite ends of the pins 88 extend through openings in the side sections 38 of the differential casing and are threaded into complementary internally threaded openings formed in the plate 84. Resilient means is provided to normally retain the plate 84 in an inoperative position and includes springs 92 which are disposed about the shanks of the pins 88 for biasing the ring 86 outwardly and thereby moving the plate 84 away from the plate 80.

To insure a definite and sturdy locking engagement of the plate 84 with the plate 80, the plate 84 is provided with a laterally extending lateral flange 94 which is bevelled on its inner circumference. The plate 80 is formed with a complemental bevelled periphery 96 so that a wedge-like locking engagement is obtained between the two plates.

Means is provided for moving the ring-like member 86 and the actuating pins 88 inwardly relative to the casing 28 and comprises a yoke 100, as seen in Figures 4 and 5. The yoke 100 terminates in arms 102 and 104 upon which are rotatably disposed bearing assemblies 106 and 108. The bearing rings 106 and 108, as seen in Figure 4, are adapted to bear against the outer surface of the ring 86, so that the ring 86 can freely rotate with the differential casing, while the yoke is retained in a fixed vertical position. The yoke is provided with a sleeve 110 within which is releasably secured an actuating rod or shaft 112. In this respect, a pair of transverse openings 114 and 116 are formed in the sleeve and a complementary pair of openings 118 and 120 are formed transversely in the rod 112 in vertical spacement. A pair of locking pins 122 and 124 are adapted to be inserted through the aligned openings 116, 118, 114 and 120 to securely lock the rod 112 in the sleeve 110. The rod 112 is formed at its upper end with a multi-sided or four-sided head 126, the rod terminating thereabove in an exteriorly threaded end 128. An actuating arm 130, having a square opening is provided. The square opening 131 is adapted to engage on the square head 126, with a locking nut 132 secured on the threaded terminus 128 of the rod. The actuating arm 130 is connected to an operating cable or rod 134. In this respect, the rod 134 has a lateral terminal 136 which is inserted through an opening in the opposite end of the arm 130 and retained therein by means of a cotter pin 138. The rod 134 terminates at its other end in a clevised terminal 140 within which is pivotally mounted by means of a lateral pivot pin 142 a link 144. The link 144 is connected at its opposite end to a foot pedal 148, the same having a lateral spindle 150 which is rotatably disposed in a bearing 152 mounted as at 154 to a suitable support 156.

The rod 134 extends longitudinally of the differential, and the operating foot lever 148 is preferably mounted in the motor vehicle adjacent to the foot pedal on the floor board, so that the same may be disposed adjacent to the operator's position. Of course, if found convenient, a hand lever or the like could readily and easily be substituted for the foot pedal 148.

The operation of the device thus far is believed very simple and is as follows:

When one of the driven or rear wheels spins in mud or the like, the brake pedal 148 is moved forwardly about its pivot point and moves the rod 134 forwardly moving the arm 130. The yoke 100 is correspondingly moved about its vertical pivot point and forced against the ring 86. The force exerted on the outer surface of the ring 86 moves the pins 88 inwardly and forces the movable plate 84 against the plate 80 so that the axle section 74 is forced to rotate with the other axle section 74 at the same rate of speed. Of course, release of the foot pedal 148 releases the pressure on the ring 86 and allows the springs 92 to move the plate 84 away from the plate 80.

Thus, it can be seen that there is provided a novel driving wheel assembly for motor vehicles wherein the independent axle sections can be selectively rotated at the same rate of speed in the event one of the wheels becomes stuck in mud or the like. Further, it can be seen that in the event one of the axle sections becomes damaged or breaks the vehicle can be driven through the opposite axle section.

Although one embodiment of this invention has been illustrated and described, it is to be understood that minor variations and changes may be made without departing from the spirit of the invention and the scope of the appended claims.

Having described the invention, what is claimed as new is:

1. In a drive wheel assembly for motor vehicles, a differential housing, a gear casing rotatably disposed in said housing, a drive shaft operatively extending into said housing and operatively associated with said gear casing, axle sections rotatably mounted in opposed side walls of said housing, gears slidably mounted on said axle sections within the gear casing, pinions rotatably mounted in said casing and meshing with said gears, a clutch rotatably mounted in said gear casing for rotating said axle sections unitarily, said clutch comprising a plate keyed to one of the axle sections and a complementary plate attached to and adapted to rotate with said gear casing for cooperative locking engagement with said first-mentioned plate, means for actuating said clutch including a ring slidably and rotatably disposed in said housing, a plurality of spaced laterally extending pins carried by said ring and connected through said casing to said clutch, a yoke pivotally mounted in said housing and having bearing terminals engaged on said rotating ring for sliding the ring and pins towards said clutch, a linkage operable externally of the housing and connected to said yoke for swinging the same about its pivot, and resilient means disposed on said pins for normally retaining said clutch in an inoperative position.

2. In a drive wheel assembly for motor vehicles, a differential housing, a gear casing rotatably disposed in said housing, a drive shaft operatively associated with said casing, gears rotatably disposed on opposite sides in said casing, axle sections rotatably mounted in opposed side walls of said housing and having splined ends slidably locked in said gears, pinions rotatably mounted in said casing and meshing with said gears, a clutch rotatably mounted in said gear casing and operatively connected to one of said splined axle sections and said gear casing for locking said axle sections unitarily so that they rotate at the same rate of speed, means for actuating said clutch including a ring like member rotatably disposed in said housing, a plurality of spaced pins laterally extending from said member and operatively connected through said casing to the clutch, a yoke pivotally mounted in said housing and having bearing terminals operatively engaged on said ring for sliding the ring and pins towards said clutch, a linkage externally operable of said housing and connected to said yoke for swinging the yoke about its pivot, resilient means disposed on said pins for normally retaining said clutch in an inoperative position.

3. In a drive wheel assembly for a motor vehicle, a differential housing, a gear casing rotatably disposed in said housing, a drive shaft operatively extending into said housing and operatively associated with said gear casing, axle sections rotatably mounted in opposed side walls of said housing and having splined ends slidably disposed in said casing, opposed gears disposed in said casing and mounted on said splined ends, pinions rotatably mounted in said casing and meshing with said gears, a friction clutch rotatably mounted in said gear casing and operatively connected to said gear casing and one of said axle sections for rotating said axle sections unitarily, said clutch comprising a plate keyed to one of the axle sections and a complementary plate attached to and adapted to rotate with said gear casing for cooperative locking engagement with said first-mentioned plate, means for actuating said clutch including a ring slidably and rotatably disposed in said housing, a plurality of spaced laterally extending pins carried by said ring and connected through said casing to the clutch, a yoke pivotally mounted in said housing and having bearing terminals engaged on said rotating ring for sliding said ring and pins towards said clutch, actuating means operable externally of the housing and connected to said yoke for swinging the same about its pivot, and resilient means disposed on said pins for normally retaining said clutch in an inoperative position.

4. The combination of claim 3, wherein said clutch includes a fixed clutch plate disposed on the splined end of one of the axle sections, a movable clutch plate anchored to the ends of the pins, a beveled annular flange projecting from said movable plate and a cooperatively configured periphery on said fixed plate.

5. In a differential for a motor vehicle including a housing, a gear casing rotatably disposed in said housing, a drive shaft operatively extending into said housing and associated with said gear casing, axle sections rotatably mounted in opposed side walls of said housing and having splined ends slidably in said casing, opposed gears disposed in said casing and held on said splined ends, and pinions rotatably mounted in said casing and meshing with said gears, a friction clutch for releasably locking the axle sections in synchronized rotation including a clutch plate disposed on the splined end of one of the axle sections and rotatable therewith, a movable clutch plate rotatably disposed in the casing, an actuating ring slidably and rotatably disposed in said housing, a plurality of spaced laterally extending pins carried by said ring and anchored to said movable clutch plate, a yoke pivotally mounted in said housing and having bearing terminals engaged on said ring for sliding said ring and movable clutch plate inwardly, actuating means operable externally of the housing and connected to said yoke for swinging the same about its pivot, resilient means disposed on said pins for normally retaining said movable clutch plate from the fixed plate.

STANLEY CHAPP.

REFERENCES CITED

The following references are of record in the file of this patent:

UNITED STATES PATENTS

| Number | Name | Date |
|---|---|---|
| 1,173,442 | Kuhn | Feb. 29, 1916 |
| 1,447,116 | Baird et al. | Feb. 27, 1923 |
| 1,481,889 | Carhart | Jan. 29, 1924 |
| 1,506,915 | Minthorn | Sept. 2, 1924 |
| 1,546,064 | Focher | July 14, 1925 |
| 1,630,210 | Olson | May 24, 1927 |
| 1,743,032 | Focher, Jr. | Jan. 7, 1930 |
| 1,791,198 | Focher | Feb. 3, 1931 |
| 1,857,746 | Strandt | May 10, 1932 |